United States Patent

[11] 3,627,882

[72] Inventors John H. Coats
Kalamazoo;
Curtis E. Meyer, Galesburg; Thomas R. Pyke, Prairie Rond Township, Kalamazoo County, all of Mich.
[21] Appl. No. 712,484
[22] Filed Mar. 12, 1968
[45] Patented Dec. 14, 1971
[73] Assignee The Upjohn Company
Kalamazoo, Mich.
Continuation of application Ser. No. 418,811, Dec. 16, 1964, now abandoned. This application Mar. 12, 1968, Ser. No. 712,484

[54] ANTIBIOTIC DERMADIN AND A PROCESS FOR PRODUCING THE SAME
8 Claims, 1 Drawing Fig.

[52] U.S. Cl. ..................................................... 424/121

[51] Int. Cl. ....................................................... A61k 21/00
[50] Field of Search ............................................ 424/121, 122, 120

[56] References Cited
UNITED STATES PATENTS
3,147,184  9/1964  Gaeumann et al. ............ 424/115

Primary Examiner—Jerome D. Goldberg
Assistant Examiner—Daren M. Stephens
Attorneys—Eugene O. Retter and George T. Johannesen ABSTRACT: New antibiotic dermadin and a microbiological process for the production thereof using the micro-organism *Trichoderma viride*. Dermadin is an antibacterial and can be used in paper mill systems to inhibit the growth of *Aerobacter aerogenes* which is known to produce slime in such system.

PATENTED DEC 14 1971 3,627,882
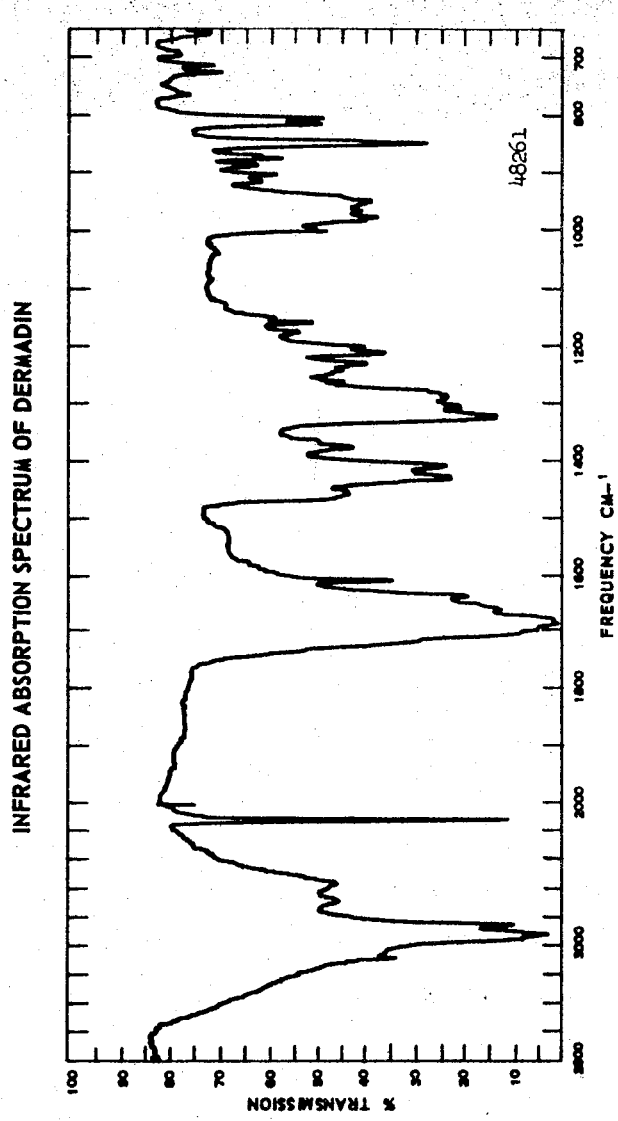
JOHN H. COATS
CURTIS E. MEYER
THOMAS R. PYKE
INVENTORS
ATTORNEYS

ANTIBIOTIC DERMADIN AND A PROCESS FOR PRODUCING THE SAME

CROSS REFERENCE TO RELATED APPLICATION

This application is a continuation of copending application Ser. No. 418,811, filed on Dec. 16, 1964 end now abandoned.

BRIEF SUMMARY OF THE INVENTION

Dermadin (U-21,963) is a biosynthetic product obtained by culturing a dermadin-producing Trichoderma sp. in an aqueous nutrient medium under aerobic conditions. It has the property of adversely affecting the growth of Gram-positive and Gram-negative bacteria, for example, *Bacillus subtilis*, *Bacillus cereus*, *Salmonella gallinarum*, *Escherichia coli*, *Salmonella pullorum*, *Sarcina lutea*, and *Mycobacterium avium*. Accordingly, dermadin can be used alone or in combination with other antibacterial agents to prevent the growth of, or reduce the number of, such organisms present in various environments where the infecting micro-organism is susceptible to the antibiotic. Also, it is useful in wash solutions for sanitation purposes, as in the washing of hands and the cleaning of equipment, floors, or furnishings of contaminated rooms or laboratories. It can also be used as a feed supplement to promote the growth of animals, for example, mammals, birds, fish, and reptiles. The Trichoderma according to this invention is a newly isolated strain of the known organism, *Trichoderma viride*. The strain of *Trichoderma viride* which elaborates dermadin, under the fermentation conditions hereinafter disclosed, has been deposited with, and can be obtained from, The Fermentation Division, Northern Utilization Research Branch, U.S. Department of Agriculture, Peoria, Ill. Its deposit number is NRRL 3153.

The new compound of the invention is produced when the elaborating organism is grown in an aqueous nutrient medium under submerged aerobic conditions. It is to be understood that for the preparation of limited amounts surface cultures in bottles can be employed. The organism is grown in a nutrient medium containing a carbon source, for example, an assimilable carbohydrate, and a nitrogen source, for example, an assimilable nitrogen compound or protein aceous material. Preferred carbon sources include glucose, brown sugar, sucrose, glycerol, starch, corn starch, lactose, dextrin, molasses, and like carbohydrate sources. Preferred nitrogen sources include corn steep liquor, yeast, autolyzed Brewer's yeast with milk solids, pancreatic digest of casein, distiller's solubles, animal peptone liquors, meat and bone scraps, and like nitrogenous sources. Combination of these carbon and nitrogen sources can be used advantageously. Trace metals, for example, zinc, magnesium, manganese, cobalt, iron, and the like, need not be added to the fermentation media since tap water and unpurified ingredients are used as media components.

Production of the compound of the invention can be effected at any temperature conductive to the satisfactory growth of the micro-organism, for example, between about 18° and 40° C. and preferably between about 25° and 30° C. Ordinarily, optimum production of the compound is obtained in from about 2 to 10 days. The medium normally stays fairly close to neutral, or on the acidic side, during the fermentation. The final pH is dependent, in part, on the buffers present, and in part on the initial pH of the culture medium which is advantageously adjusted to about pH 6–8 prior to sterilization.

When growth is carried out in large vessels and tanks, it is preferable to use the vegetative form rather then the spore form of the micro-organism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new compound as long as it is such that a good growth of the micro-organism is obtained.

The new compound of the invention, dermadin, is an acidic substance whose elemental analysis indicates the empirical formula $C_9H_7NO_3$. Dermadin is soluble in chloroform, methylene chloride, and like halogenated hydrocarbons; methanol, ethanol, and like alcohols; and ethyl acetate, amyl acetate, butyl acetate, and like aliphatic esters. Dermadin is soluble in water to the extent of about 4 mg./ml.

A variety of procedures can be employed in the isolation and purification of dermadin, for example, solvent extraction, liquid–liquid distribution in a Craig apparatus, the use of adsorbents, and crystallization from solvents. Solvent extraction procedures are preferred for commercial production inasmuch as they are less time consuming and less expensive, and higher recovery yields are obtained thereby.

In a preferred process, dermadin is recovered from its culture medium by separation of the mycelium and undissolved solids from the fermentation broth by conventional means such as by filtration or centrifugation. The antibiotic is then extracted from the filtered or centrifuged beer. For the extraction of dermadin the solvents listed above can be used; ethyl acetate is preferred. The extracts thus obtained can be evaporated to dryness to provide the antibiotic in crude form. Preferably, however, the extracts are processed further to obtain more purified forms of the antibiotic. The solvent extracts are combined and then extracted with water at about a neutral pH. The resulting aqueous extracts contain the major portion of dermadin. These extracts are concentrated under reduced pressure to give an aqueous concentrate of dermadin. The aqueous concentrate can be freeze-dried to give a dry preparation of dermadin. This preparation can be readily mixed with animal and fish feed for use in such environments. When higher purity is desired, the aqueous concentrate of dermadin is subjected to further processing, preferably by solvent extraction and use of adsorbents. In a preferred purification process the aqueous concentrate of dermadin is extracted with Skellysolve B (isomeric hexanes) at a pH of about 7. The remaining aqueous, which contains the major portion of dermadin, is then adjusted to a pH of about 4.5 with a mineral acid (hydrochloric preferred) and extracted with methylene chloride. The methylene chloride extracts are washed with water and then dried and concentrated. Activated carbon is mixed with the concentrate and then separated by filtration. Crystallization of dermadin is effected from the remaining clarified solution by adding chilled Skellysolve B. Alternatively, dermadin can be separated from the culture medium by use of a strongly basic anion exchange resin. Suitable anion exchange resins for this purpose are obtained by chloromethylating by the procedure given on pages 88 and 97 of Kunin, Ion Exchange Resins, 2nd Ed. (1958), John Wiley and Sons, Inc., polystyrene cross linked, if desired, with divinylbenzene, prepared by the procedure given on page 84 of Kunin, supra, and quaternizing with trimethylamine or dimethylethanolamine by the procedure given on page 97 of Kunin, supra. Anion exchange resins of this type are marketed under the trade names Dowex 1, Dowex 2, Dowex 3, Amberlite IRA-400, Duolite A-102, and Permutit S-1.

As a further alternative, dermadin can be recovered from the filtered culture medium or the organic extract by adsorption techniques, employing such adsorbents as silicic acid, decolorizing carbon or decolorizing resin (a suitable decolorizing resin is Permutit DR, U.S. Pat. No. 2,702,263), alumina and Florisil (a synthetic silicate of the type described in U.S. Pat. No. 2,393,625 and sold by the Floridin Co.). The adsorbed antibiotic can be removed from the adsorbent in relatively pure form by elution with a suitable organic solvent, e.g., one of those mentioned above in which dermadin is soluble.

Salts of dermadin are formed employing the free acid of dermadin and an inorganic or organic base. The dermadin salts can be prepared, as for example, by dissolving dermadin free acid in water, adding a dilute base until the pH of the solution is about 7 to 8, and freeze-drying the solution to provide a dried residue consisting of the dermadin salt. Dermadin salts which can be formed include the sodium, potassium, and calcium salts. Other salts of dermadin, including those with organic bases such as primary, secondary, and tertiary monoamines as well as with polyamines, can also be formed using the above-described or other commonly employed procedures. Other valuable salts are obtained with therapeutically effective bases which impart additional therapeutic effects thereto. Such bases are, for example, the purine bases such as theophyllin, theobromin, caffeine, or derivatives of such purine bases; antihistaminic bases which are capable of forming salts with weak acids; pyridine compounds such as nicotinic acid amide, isonicotinic acid hydrazide, and the like; phenylalkylamines such as adrenalin, ephedrin, and the like; choline, and others. Salts of dermadin can be used for the same biological purposes as the free acid.

Dermadin has a broad antibacterial spectrum as shown in I. The antibacterial spectrum was determined by the disc plate agar diffusion test using 13 mm. size discs.

TABLE I

Antibacterial Activity of Dermadin

| Test Organism | Zone Size (mm.) |
| --- | --- |
| Bacillus subtilis | 20 |
| Staphylococcus aureus | 18 |
| Aerobacter aerogenes | 26 |
| Klebsiella pneumoniae | 24 |
| Salmonella shottmuelleri | 24 |
| Proteus vulgaris | 16 |
| Proteus morganii | 28 |
| Escherichia coli | 22 |
| Salmonella pullorum | 27 |
| Mycobacterium avium | 28 |
| Salmonella gallinarum | 29 |
| Sarcina lutea | 28 |
| Bacillus cereus | 28 |
| Proteus mirabilis | 16 |

Dermadin has antifungal activity as shown in table II. The antifungal spectrum was determined by an agar dilution plate assay.

TABLE II

Antifungal Activity of Dermadin

| Test Organism | Minimum Inhibitory Concentration in $\mu$/ml. |
| --- | --- |
| Nocardia asteroides | 100 |
| Blastomyces dermatitidis | 100 |
| Coccidioides immitis | 1,000 |
| Geotrichum sp. | 1,000 |
| Hormodendrum compactum | 1,000 |
| Phialophora verrucosa | 1,000 |
| Cryptococcus neoformans | 100 |
| Histoplasma capsulatum | 1,000 |
| Sporotrichum schenckii | 1,000 |
| Monosporium apiospermum | 1,000 |
| Trichophyton rubrum | 100 |
| Candida albicans ABBOTT | 1,000 |
| Trichophyton violaceum | 100 |
| Trichophyton asteroides | 1,000 |
| Trichophyton mentagrophytes | 1,000 |

Dermadin is active against the alga *Chlorella vulgaris*. A 10 mg./ml. solution dissolved in 20 percent methanol–80 percent water gives a zone of inhibition of 27 mm. using a 6.35 mm. disc in a disc plate agar diffusion assay.

Dermadin also inhibits the growth of KB cells (human epidermoid carcinoma cells) in tissue culture tests.

The new compound of the invention, dermadin, is active against *Bacillus subtilis* and can be used to minimize or prevent odor in fish and fish crates caused by this organism. It can also be used for treating breeding places of silkworms to prevent or minimize infections caused by this organism. Dermadin can be used in paper mill systems to inhibit the growth of *Aerobacter aerogenes* which is known to produce slime in such systems.

The following examples are illustrative of the process and products of the present invention but are not to be construed as limiting. All percentages are by weight and all solvent mixture proportions are by volume unless otherwise noted.

EXAMPLE 1-Dermadin

A. Fermentation

A soil stock of *Trichoderma viride*, NRRL 3153, was used to inoculate a series of 500-ml. Erlenmeyer flasks, each containing 100 ml. of preseed medium consisting of the following ingredients:

Glucose monohydrate 25 g./liter
Pharmamedia[1] 25 g./liter
Tap water q.s. 1 liter The presterilization pH is adjusted to 7.2 with aqueous NaOH.

[1] Pharmamedia is an industrial grade of cottonseed flour produced by Traders Oil Mill Company, Ft. Worth, Tex.

The flasks were incubated at 28° C. for 48 hours on a Gump rotary shaker operating at 260 r.p.m.

One shake flask of the preseed described above (100 ml.) was used to inoculate a 30-liter seed tank containing 20 liters of sterile seed medium consisting of the following ingredients:

Glucose monohydrate 10 g./liter
Corn steep liquor 10 g./liter
Pharmamedia 2 g./liter
Wilson's Peptone Liquor No. 159[1] 10 g./liter
Lard oil 2 ml./liter
Tap water Balance

[1] Wilson's Peptone Liquor No. 159 is a preparation of hydrolyzed proteins of animal origin.

The seed medium presterilization pH was 7.2. The seed tank was grown for 24 hours at a temperature of 28° C., with aeration at a rate of 10 standard liters per minute, and agitation at a rate of 400 r.p.m.

The seed, described above, was then used to inoculate a 300-liter fermentor containing 250 liters of the following sterile medium:

Wilson's Peptone Liquor No. 159 5 g./liter
Malt extract[1] 3.75 g./liter
Glucose monohydrate 5 g./liter
Lard oil 1,250 ml.
Tap water Balance

[1] Obtained from Malt Diastase Company.

The fermentation proceeded for 73 hours during which time the temperature was controlled at 25° C., filtered air was supplied at a rate of 100 standard liters per minute, and agitation was at the rate of 280 r.p.m. At 73 hours, the above fermentation assayed 29.5 biounits of dermadin. The assay was conducted against the organism *Sarcina lutea* on medium Seed Agar (Baltimore Biological Laboratory, Baltimore, Md). The medium was seeded with the test organism at a rate of 0.5 ml. of an overnight culture per 1,000 ml. of agar. The plates were incubated at 30° C. overnight. A biounit is that amount of antibiotic when dissolved in 0.08 ml. of the test solution and applied to a 12.7 mm. disc, gives a 20 ml. zone of inhibition under standard microbiological conditions.

B. Recovery

The whole beer (770 ml.) from a dermadin fermentation, as described above, was filtered using 3 percent diatomaceous earth as filter aid. The cake was washed with 1/10 volume of water. The filtrate (filtered beer and wash) was chilled to less than 10° C. and extracted three times with 1/3 volume portions of ethyl acetate. The ethyl acetate extracts were combined (735 ml. assaying 3.4 biounits/ml. against *Sarcina lutea*) and then extracted three times with one-third volume portions of water while maintaining the mixture at pH 7 with sodium hydroxide. The aqueous extracts were combined (820 ml. assaying 3.3 biounits/ml. against *Sarcina lutea*) then concentrated under reduced pressure at less than 40° C. This aqueous concentrate can be further purified, as shown in Part C following, or it can be freeze-dried to provide a substantially pure preparation of dermadin. The aqueous concentrate in this example was freeze-dried to yield 1.2 grams of dermadin assaying 3.2 biounits/mg. against *Sarcina lutea*.

C. Purification

The dermadin aqueous concentrate, obtained from a process as described above, is adjusted to pH 7 and then extracted twice with one-eight volume portions of Skellysolve B (isomeric hexanes). The Skellysolve B extracts are discarded. The remaining aqueous is adjusted to pH 4.5 with hydrochloric acid and then extracted four times with one-half volume portions of methylene chloride. The methylene chloride extracts are combined and washed with one two-hundredth volume of water. The water wash is discarded. The washed methylene chloride extract is then dried with anhydrous sodium sulfate and concentrated at 30° C. to one-thirtieth of the original beer volume. The concentrate is then stirred for 10 minutes with about 0.4 percent of activated carbon. The carbon is filtered from the mixture and the remaining solution chilled. Four volumes of chilled Skellysolve B are then added and the solution allowed to stand for about 2 hours during which time crystals appear. The supernatant is decanted and the crystals collected on a coarse funnel. Recrystallization is accomplished by dissolving the crystals in a minimum amount of methylene chloride and then adding Skellysolve B to induce crystallization.

EXAMPLE 2—Potassium Salt of Dormadin

Dermadin (0.5 g.), as prepared in example 1, was dissolved in 3 ml. of absolute ethanol and to the solution was added 260 mg. of potassium bicarbonate dissolved in 1 ml. of water. Upon the addition of 15 ml. of acetone, the potassium salt of dermadin crystallized. The crystals were filtered, rinsed with acetone and dried; yield 430 mg. of crystalline potassium dermadin.

Chemical and Physical Properties of Dermadin

Crystalline dermadin has the following physical and chemical properties:

Elemental Analysis:
C=60.18
H=4.09
O=26.78
N=7.56
Empirical Formula: $C_9H_7NO_3$
Optical Rotation: $[\alpha]_{25}^D = +138°$ (c,=0.88, 50 percent aqueous alcohol)
Solubility:
Soluble: chloroform, methylene chloride, methanol, ethanol, acetone, and ethyl acetate.
Soluble in water to the extent of about 4 mg./ml.
Titration: pKa'=5.05.
Equivalent Weight: 185 as determined by titration.
Molecular Weight: 177 as determined by mass spectroscopy.
Ultraviolet Spectrum:

Dermadin has the following ultraviolet absorption spectrum:

| Solvent | Max. | a |
|---|---|---|
| 0.01 M alcoholic $H_2SO_4$ | 223 m$\mu$ | 84.24 |
| Ethanol | 223 m$\mu$ | 85.44 |

Infrared Spectrum:

The infrared absorption spectrum of dermadin suspended in mineral oil mull is reproduced in the drawing. Dermadin shows peaks at the following wavelengths expressed in reciprocal centimeters:

| | | | |
|---|---|---|---|
| 3,080 (M) | 1,431 (S) | 1,212 (M) | 902 (W) |
| 2,950 (S) | 1,409 (S) | 1,200 (M) | 885 (W) |
| 2,920 (S) | 1,375 (M) | 1,175 (M) | 874 (M) |
| 2,850 (S) | 1,367 (M) | 1,160 (M) | 868 (W) |
| 2,680 (M) | 1,325 (S) | 1,150 (W) | 847 (S) |
| 2,550 (M) | 1,308 (S) | 1,130 (W) | 842 (M) |
| 2,120 (M) | 1,290 (S) | 997 (M) | 811 (M) |
| 1685 (S) | 1,280 (S) | 982 (M) | 803 (M) |
| 1,662 (S) | 1,262 (M) | 975 (M) | 760 (W) |
| 1,639 (S) | 1,250 (M) | 965 (M) | 753 (W) |
| 1,609 (M) | 1,242 (M) | 948 (M) | 720 (W) |
| 1,458 (M) | 1,228 (M) | 915 (W) | |
| | 1,099 (W) | | 690 (W) |

Band intensities are indicated as "S," "M," and "W," respectively, and are approximated in terms of the backgrounds in the vicinity of the bands. S bands are the same order of intensity as the strongest band in the spectrum; M bands are between one-third and two-thirds as intense as the strongest band, and W bands are less than one-third as intense as the strongest band. These estimates are made on the basis of a percent transmission scale.

We claim:

1. An antibiotic assaying at least 29.5 biounits of dermadin, a compound which a. is effective in inhibiting the growth of various Gram-positive and Gram-negative bacteria; and in its essentially pure crystalline form
   b. is soluble in chloroform, methylene chloride, methanol, ethanol, acetone, and ethyl acetate; and soluble in water to the extent of about 4 mg./ml.;
   c. has the following elemental analysis;
      60.18; H, 4.09; N, 7.56;
   d. has a molecular weight of 177 as determined by mass spectroscopy;
   e. has an ultraviolet absorption spectrum as follows:
      0.01 N alcoholic $H_2SO_4$   223 m$\mu$, a=84.24
      Ethanol           223 m$\mu$, a=85.44;
   f. has an optical rotation $[\alpha]_{25}^D = +138°$ (c=0.88, 50 percent aqueous alcohol); and
   g. has a characteristic infrared absorption spectrum as shown in the accompanying drawing.

2. A compound as defined in claim 1, dermadin, in its essentially pure form.

3. A compound as defined in claim 1, dermadin, in its essentially pure crystalline form.

4. A compound selected from the group consisting of dermadin, according to claim 1, and salt thereof with alkali metal alkaline earth metal, and amine.

5. Potassium salt of dermadin, the compound defined in claim 1.

6. A process for preparing dermadin, as defined in claim 1, which comprises cultivating *Trichoderma viride*, NRRL 3153, in an aqueous nutrient medium under aerobic conditions until substantial antibacterial activity is imparted to said medium by production of dermadin.

7. A process according to claim 6 which comprises cultivating *viride*, 3153, an aqueous nutrient medium containing a source of assimilable carbohydrate and assimilable nitrogen under aerobic conditions until substantial antibacterial activity is imparted to said medium by production of dermadin and isolating the dermadin so produced.

8. A process according to claim 7 in which the isolation comprises filtering the medium, extracting the filtrate with a water-immiscible solvent for dermadin, and recovering dermadin from the solvent extract.

* * * * *

UNITED STATES PATENT OFFICE
CERTIFICATE OF CORRECTION

Patent No. 3,627,882                Dated  December 14, 1971

Inventor(s) John H. Coats, Curtis E. Meyer, Thomas R. Pyke

It is certified that error appears in the above-identified patent and that said Letters Patent are hereby corrected as shown below:

Column 1, line 5, for "end" read -- and --; line 40, for "protein aceous" read -- proteinaceous --. Column 3, line 19, for "in I" read -- in Table I --. Column 3, Table I, the number "18" should be directly under the number "20". Column 3, line 44, for "table" read -- Table --; line 52, for "Inhipitory" read -- Inhibitory --. Column 5, line 35, for "Dormadin" read -- Dermadin --; line 54, for "$[\alpha]_{25}^{D} = +138°$" read -- $[\alpha]_{D}^{25} = +138$ --; line 63, for "py. Ultraviolet Spectrum:" the "Ultraviolet Spectrum:" should start a new line; line 67, for "M" read -- N --. Column 6, lines 6-15, the first two columns are out of line, 2nd column, last line, for "1,228 (M09 (W)" read -- 1,228 (M) --, 4th column, between "720 (W) and 690 (W)" read -- 709 (W) --. Column 6, line 36, for "60.18; H, 4.09; N, 7.56" read -- C, 60.18; H, 4.09; O, 26.78; N, 7.56 --; line 40, for "N" read -- N --; line 42, for "$[\alpha]_{25}^{D}$" read -- $[\alpha]_{D}^{25}$ --; line 52, for "metal alkaline" read -- metal, alkaline --; line 61, for "ing viride" read -- ing Trichoderma viride --; for ", an" read -- , in an --.

Signed and sealed this 1st day of August 1972.

(SEAL)
Attest:

EDWARD M. FLETCHER, JR.        ROBERT GOTTSCHALK
Attesting Officer              Commissioner of Patents